(No Model.)
F. LEBEL.
HUB ATTACHING DEVICE.
No. 545,126. Patented Aug. 27, 1895.
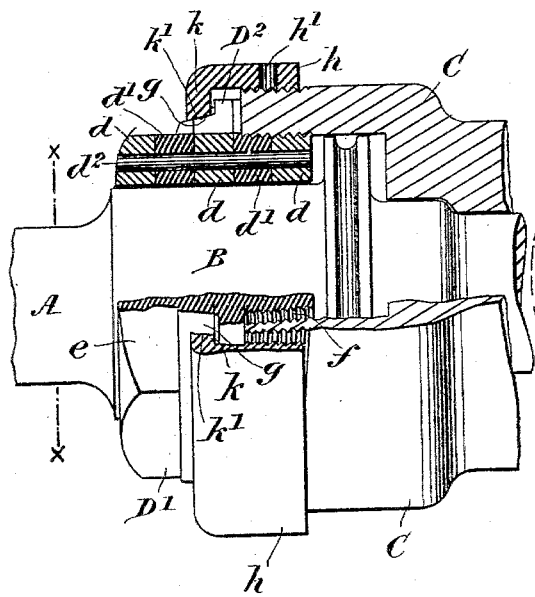
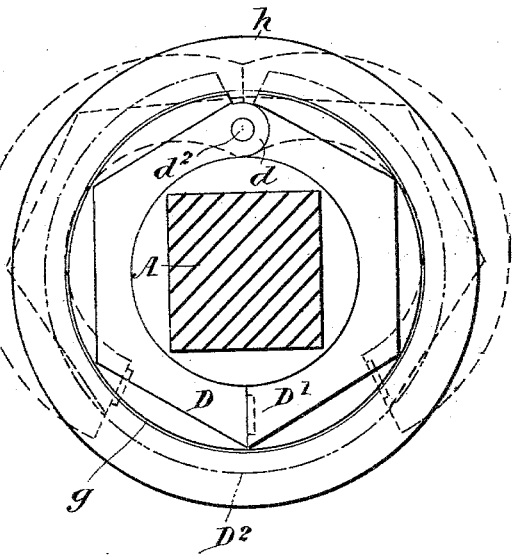
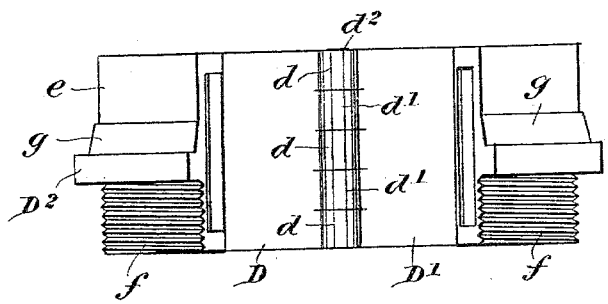
Witnesses
Inventor
Florian Lebel
By his Attorney

UNITED STATES PATENT OFFICE.

FLORIAN LEBEL, OF MONTREAL, CANADA.

HUB-ATTACHING DEVICE.

SPECIFICATION forming part of Letters Patent No. 545,126, dated August 27, 1895.

Application filed April 15, 1893. Renewed July 5, 1895. Serial No. 555,026. (No model.)

*To all whom it may concern:*

Be it known that I, FLORIAN LEBEL, of the city of Montreal, in the district of Montreal and Province of Quebec, Canada, have invented certain new and useful Improvements in Hub-Attaching Devices; and I do hereby declare that the following is a full, clear, and exact description of the same.

This invention relates to the means used for holding the wheels in place upon the journals of the axle, and has for its object to so construct such parts that it will at all times be a simple and easy matter to remove and replace same, as well as to effect a tight joint and to take up any wear of the parts.

To these ends my invention consists in the use of a nut made in two parts and hinged together, so as by opening and closing to be readily fitted over the axle and turned into screw-threaded connection with the hub-box, the usual ring or collar located externally of such nut having an inner beveled surface adapted to bear upon a correspondingly-beveled surface on the outside of the nut, and by some additional turning serve to take up any looseness or slack between the two halves of the nut and the screw-threads of the nut and the hub-box.

For full comprehension, however, of the invention reference must be had to the annexed drawings, forming a part of this specification, in which like symbols indicate corresponding parts, and wherein—

Figure 1 is a part view of the axle proper, journal portion, and means for holding the hub-sleeve in place, such means and the hub-sleeve being shown partly in section. Fig. 2 is a sectional elevation on line $x$ $x$, Fig. 1, and Fig. 3 a separate detail interior view of the nut in its open position.

A is the axle proper, and B the inner portion of the journal.

C is the usual hub-box slipped on the journal and held in place by means of a nut, which in this case is shown formed of two halves or segments D D', hinged together at one side or end by knuckles $d$ $d'$ and pin or rivet $d^2$, and having their opposite free ends respectively of male and female formation, so as to effect a locking against lateral movement after they have been brought together. The nut has the usual flange portion $D^2$, dividing the plane-surfaced portion $e$ from the screw-threaded part $f$, and the corner formed by such flange $D^2$ and plane-surfaced portion $e$, instead of being, as usually, rectangular, is obtuse, to afford a beveled or inclined annular section on surface $g$.

$h$ is the usual ring or collar, having an inner flange $k$ at one side and screw-threaded to take onto the hub-box C, screw-threaded in an opposite direction to that of the thread on the nut, exteriorly to correspond, the inner edge $k'$ of the flange being beveled to correspond also with the inclined surface $g$ of the nut. The ring $h$ has the usual recess $h'$ in it to receive any suitable instrument for removing the same.

By my invention a nut is produced which can be easily set in place or removed at will after the axle has been connected with the carriage-body, and, since its parts are unalterable laterally in their relation to each other, the screw-threads, when the parts are closed, are certain to coincide. The respective beveled surfaces $g$ and $k'$ serve to secure a very close connection of the free ends of the nut and makes it practically solid.

What I claim is as follows:

1. In combination with an axle or the like and parts to be held in place thereon of a screw-threaded nut with uniform inner periphery formed in sections having interlocking ends, as set forth.

2. In combination with an axle or the like and parts to be held in place thereon, of a screw-threaded nut with uniform inner periphery formed in sections and hinged together as set forth.

3. In combination with an axle or the like and parts to be held in place thereon, of a screw-threaded nut with uniform inner periphery formed in sections and hinged together, and means externally of such nut for pressing the parts thereof closely together as set forth.

4. In combination with the journal of an axle or the like, and the hub box carried thereby, of a nut formed in two parts hinged together and having a screw threaded portion to take into a corresponding screw-threaded portion of such hub box, as set forth.

5. In combination with the journal of an axle or the like and the hub box carried thereby, of a nut formed in two parts hinged together having a screw threaded portion to take into a corresponding screw-threaded portion of such hub box, and a ring adapted to encircle and compress the parts of said nuts closely together and also screw threaded to take onto a corresponding screw-threaded portion of said hub box, as set forth.

6. The nut formed in two parts hinged together and having plane surfaced and screw threaded portions as set forth.

7. The combination of the nut formed in two parts hinged together and having plane surfaced and screw-threaded portions and a ring device adapted to encircle and compress the parts of said hub closely together as set forth.

8. The combination with an axle or the like and hub sleeve to be held in place thereon, of a nut having a beveled exterior surface and a ring encircling such nut and having a beveled interior surface to correspond with that of the nut and screw threaded to take onto such hub box as set forth.

FLORIAN LEBEL.

In presence of—
FRED. J. SEARS,
OWEN N. EVANS.